J. WOLF.
MOLD FOR MACHINES FOR MAKING HOLLOW GLASSWARE.
APPLICATION FILED JUNE 25, 1906.

922,071.

Patented May 18, 1909.
2 SHEETS—SHEET 1.

Witnesses:
Adalbert Miller
Harold Baron.

Inventor:
Jean Wolf

J. WOLF.
MOLD FOR MACHINES FOR MAKING HOLLOW GLASSWARE.
APPLICATION FILED JUNE 25, 1906.

922,071.

Patented May 18, 1909.
2 SHEETS—SHEET 2.

UNITED STATES PATENT OFFICE.

JEAN WOLF, OF COLOGNE, GERMANY.

MOLD FOR MACHINES FOR MAKING HOLLOW GLASSWARE.

No. 922,071.

Specification of Letters Patent.

Patented May 18, 1909.

Application filed June 25, 1906. Serial No. 323,371.

*To all whom it may concern:*

Be it known that I, JEAN WOLF, manager of a glass-works, a subject of the German Emperor, and resident of Meister Gerhardt-strasse 6, Cologne, Germany, have invented certain new and useful Improvements in Molds for Machines for Making Hollow Glassware, of which the following is a specification.

The invention relates to machines for the manufacture of hollow glass-ware, in which the pressing and blowing of the glass follow one another uninterruptedly.

The invention consists of first, a new arrangement of the press-mold and the blow-mold of such machines, and secondly a new arrangement of means for moving the blow-mold. The press-mold is firmly fixed on the standard; the blow-mold can with the aid of suitable devices be moved upward and downward. In the lowest position the blow-mold is pushed over the press-mold, from which it is taken off by the upward movement.

My invention is illustrated by the accompanying drawing.

The same numerals denote the same parts in both figures.

Figure 1:
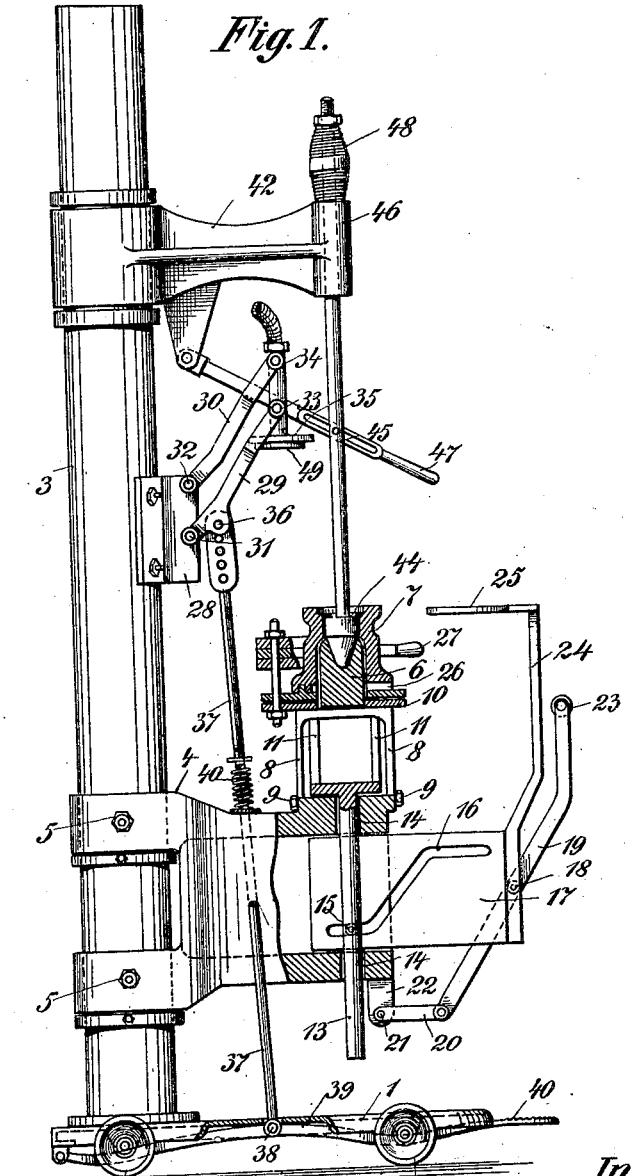
Figure 2:
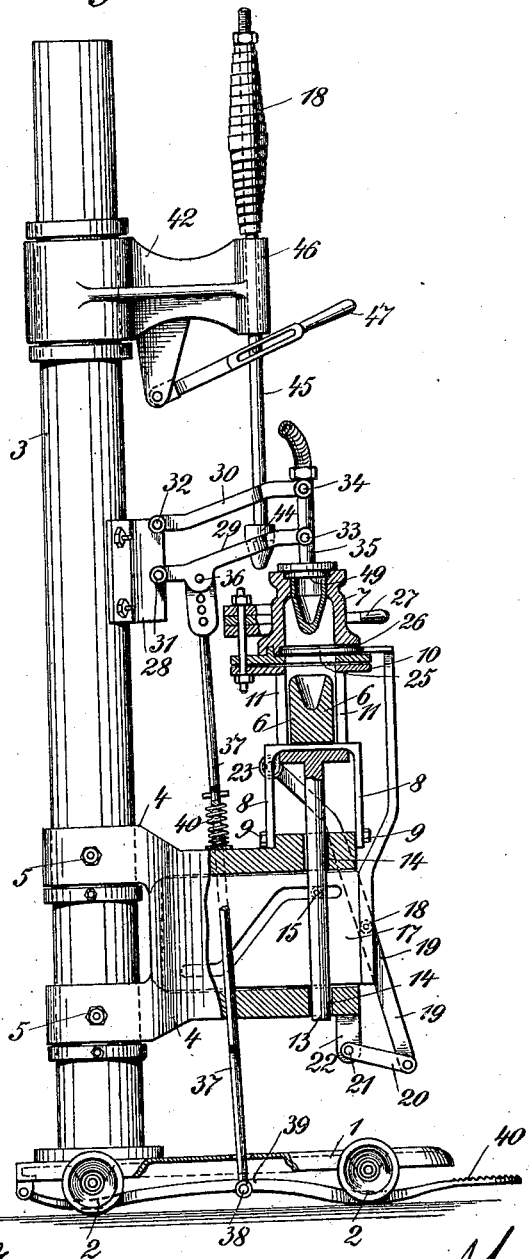

Figure 1 is a side view and partly a vertical section of the machine according to the present invention, showing the blow mold lowered and the machine therefore ready for pressing. Fig. 2 shows a similar view of the machine with the blow-mold raised. In this position the machine is ready for blowing.

On the platform 1, which can be provided with rollers 2, the standard 3 is fixed. This standard acts as carrier for all parts of the pressing and blowing arrangement. On the lower part of the standard 3 the frame 4 is situated, which can be made to turn around the standard 3. The frame 4 can be fastened firmly to the standard by means of the screw 5. The frame 4 carries the press-mold 6 and the blow-mold 7. The press-mold rests fixedly on the stage 8, which is suitably adapted for the purpose. This stage 8 is fixed on the frame 4 by means of screws 9 or the like. It is obvious that the press-mold 6 cannot be moved either upward or downward. The blow-mold 7 rests on the plate 10, which is firmly attached to the support 11. Under this support there is a rod 13, which goes through the holes 14 of the frame 4. On the rod 13 a pin 15 projects sidewise which is adapted to move in the slot 16 of the slide 17. The slide 17 moves forward and backward in the frame 4. This slide is connected at 18 with the lever 19 which is by means of the link 20 jointed at 21 to the frame 4. The lever 19 has at its free end a handle 23. On the slide 17 there is also the support 24 for the bottom 25 of the blow-mold 7 which enters the latter through the opening 26 as soon as it moves upward.

The blow-mold 7 is made up in the well known manner of two parts which are opened and closed by means of the handles 27. On the standard 3 there is also the attachment 28 provided for the two arms 29 and 30, which are respectively hinged at 31 and 32. These two arms are parallel to one another and are forked at their free ends. They support the blow-head 35 by means of the joints 33 and 34 respectively. The arm 29 is connected at 36 with the rod 37; the other end of this rod 37 is connected at 38 with the lever 39 which is provided with a pedal 40. By pressure on the pedal 40, the blow-head 35 can be lowered, whereby a spring 41 on the rod 37 is tightened. When the pedal 40 is released and so the lever 39 the blow-head is automatically raised by the spring. Farther on the standard 3 the support 42 for the press-head 44 is situated. This support swings sidewise, and has a collar 46 through which the rod 45 passes vertically. At the bottom of the rod the press-head 44 is fixed.

47 is a hand-lever for pressing down the press-head.

48 is a spring situated around the rod which automatically works the upward movement of the press-head 44.

The working of the described machine is as follows:—On the commencement of work the mold has the position shown in Fig. 1. The blow-mold 7 is lowered and pushed over the press-mold 6. In this position the molten glass is brought into the mold, and is then pressed by the lowering of the press-head. As the press-mold cannot be pressed away from the blow-mold by the pressing down of the press-head, so there is between the two molds no crack through which the molten glass can penetrate. The formation of projecting ribs on the outside of the glass object is therefore avoided. Such outside markings take place in the known machines in which the press-mold is arranged movable, but the blow-mold fixed. After the press-head 44 has been allowed to rise by releasing the lever 47, the arm 42 carrying the press-head is turned sideward toward the standard 3. By means of the lever 19 the slide 17 is pushed so that it has the position shown in Fig. 2; the pin 15 therefore moves upward in the slot 16 of the slide 17 so that the rod 13 with the support 11 of the plate 10 and blow-mold 7 is raised. At the same time the bottom 25 enters through the opening 26 under the blow-mold (Fig. 2). The pressed glass material now hangs in the blow-mold. The pedal 40 is then pressed down so that the lever 39, the rod 37, the arms 29 and 30, are operated bringing down the blow-head 35 into position. The blow-head 35 fits on the blow-mold 7, when at the same time the valve, arranged in well-known manner, opens. The compressed air entering from the blow-head blows out the previously pressed glass to the form of the mold. The arms 29 and 30 hold the blow-head, so that its lower surface 49 fits exactly horizontally on the blow-mold 7. The real fulcrum of the lever 19 is not fixed, but lies on the link 20. It is thus provided that the slide 17 may move in a straight line and is protected from getting jammed. When the pedal 40 is released the blow-head raises itself automatically under the influence of the spring 41, into the position shown in Fig. 1. The two parts of the blow-mold 10 are then opened out by means of the handles 27 and the completed glass object taken out. If the handle 23 of the lever 19 is pulled, then the movable parts of the slide and mold come from the position shown in Fig. 2 into the position shown in Fig. 1. The pivots and working points are in this way so arranged, that after a short pull on the handle 23 of the lever 19, the blow-mold 7 sinks automatically by its own weight. On this account the time between the pressing and blowing operations is shortened and the producing capacity of the machine increased.

I herewith point out that the new mold may also be applied to machines, other than those of the art described. The new arrangement of the press-mold and blow-mold can also find application in all suitable kinds of machines; especially in such which have molds near or behind one another.

What I claim as my invention and desire to secure by Letters Patent is:—

1. In a machine for making hollow glassware in combination, a standard, a mold supported on the said standard, a blow head attached to the said standard and made to swing upward and backward, a press head, and a support for the latter adapted to swing sidewise on the said standard, substantially as set forth.

2. In a machine for making hollow glassware in combination, a standard, a press-mold attached to the said standard, a blow-mold adapted to move up and down and fit over the press-mold, means for moving the said blow-mold, a movable bottom adapted to close up the said blow-mold, and means for moving the said bottom, substantially as set forth.

3. In a machine for making hollow glassware in combination, a standard, a support fixed to the said standard, a press-mold firmly attached to the said support, a blow-mold movably arranged on the said support and adapted to fit over the said press-mold, means for moving upward and downward the said blow-mold, a movable bottom adapted to close up the said blow-mold, and means for moving the said bottom, a blow-head attached to the said standard by means of a joint and made to swing upward and backward, a press head, and a support for the latter, adapted to swing sidewise on the said standard, substantially as set forth.

4. In a machine for making hollow glassware, in combination, a standard, a support fixed to the said standard, a press mold firmly attached to the said support, a frame like support vertically guided in the first said support, a blow mold fixed to the said frame like support and adapted to fit over the said press-mold, means for moving the said blow mold support, a horizontally shiftable bottom adapted to close up the said blow-mold, and means for shifting the said bottom, two parallel arms hinged on the said standard, a blow-head hinged on the free ends of the said two arms, means for moving the said blow-head downward and upward, a second support turnably attached to the said standard, and a press head vertically guided in the last said support, substantially as set forth.

5. In a machine for making hollow glassware, in combination, a standard, a support fixed to the said standard, a press-mold firmly attached to the said support, a rod vertically guided in the said support, a frame like support fixed on the said rod, a blow mold arranged on the last said support and adapted to fit over the said press-mold, a slide horizontally guided in the first said support, an oblique slot with a horizontal lower and upper end and arranged in the said slide, a pin on the said rod and engaging into said slot, and means for moving the said slide, a horizontally shiftable bottom adapted to close up the said blow-mold, and means for shifting the said bottom, two parallel arms hinged on the said standard, a blow-head hinged on the free ends of the said two arms, means for moving the said blow-head downward and upward, a second support turnably attached to the said standard, and a press head vertically guided in the last said support, substantially as set forth.

6. In a machine for making hollow glassware, in combination, a standard, a support fixed to the said standard, a press mold firmly attached to the said support, a rod vertically guided in the said support, a frame like support fixed on the said rod, a blow-mold arranged on the last said support and adapted to fit over the said press mold, a slide horizontally guided in the first said support, an oblique slot with a horizontal lower and upper end and arranged in the said slide, a pin on the said rod and engaging into said slot, a movable bottom attached to the said slide and adapted to close up the said blowmold in the raised position, a two armed lever having a pivot on the said slide, a link on the lower end of said lever for connecting the latter with the first said support, two parallel arms hinged on the said standard, a blow-head hinged on the free ends of the said two arms, a pedal lever pivoted on the said standard, a rod connecting the said pedal lever, a second support turnably attached to the said standard, and a press-head vertically guided in the last said support, substantially as set forth.

7. In a machine for making hollow glassware, in combination a standard, a support fixed to the said standard, a press-mold firmly attached to the said support, a rod vertically guided in the said support, a frame like support fixed on the said rod, a blow-mold arranged on the last said support and adapted to fit over the said press-mold, a slide horizontally guided in the first said support, an oblique slot with a horizontal lower and upper end and arranged in the said slide, a pin on the said rod and engaging into said slot, an arm fixed to the said slide, a bottom on the upper end of the said arm and adapted to close up the said blow-mold in the raised position, a two armed lever having a pivot on the said slide, a link on the lower end of said lever for connecting the latter with the first said support, two parallel arms hinged on the said standard, a blow-head hinged on the free ends of the said two arms, a pedal lever pivoted on the said standard, a rod connecting the said two arms with the said pedal lever, a spring on the said rod and arranged to hold the said two arms with the blow-head in the upper position, a second support turnably arranged on the said standard, a collar on the free end of the last said support, a rod vertically guided in the said collar, a press-head on the lower ends of the last said rod, a spring on the latter and arranged to hold the said press-head in the upper position, and a hand lever pivotally fastened on the last said support and adapted for lowering the said press-head, substantially as set forth.

In testimony whereof I have hereunto signed my name this 15th day of June 1906, in the presence of two subscribing witnesses.

JEAN WOLF.

Witnesses:
   BESSIE F. DUNLAP,
   LOUIS VANDORY.